(12) United States Patent
Li et al.

(10) Patent No.: US 10,910,135 B2
(45) Date of Patent: Feb. 2, 2021

(54) SURGE ARRESTER AND ASSOCIATED MANUFACTURING METHOD

(71) Applicant: ABB Power Grids Switzerland AG, Baden (CH)

(72) Inventors: Chun Li, Beijing (CN); Jian He, Beijing (CN); Deli Gao, Beijing (CN); Maoshan Niu, Beijing (CN); Ektor Sotiropoulos, Zürich (CH); Felix Greuter, Ruetihof (CH); Jiansheng Chen, Beijing (CN); Jens Rocks, Freienbach (CH)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 266 days.

(21) Appl. No.: 16/202,604

(22) Filed: Nov. 28, 2018

(65) Prior Publication Data

US 2019/0189310 A1 Jun. 20, 2019

Related U.S. Application Data

(63) Continuation of application No. PCT/CN2016/100609, filed on Sep. 28, 2016.

(51) Int. Cl.
*H01C 7/12* (2006.01)
*H01B 17/16* (2006.01)
(Continued)

(52) U.S. Cl.
CPC ............. *H01C 7/126* (2013.01); *H01B 17/16* (2013.01); *H01B 17/38* (2013.01); *H01B 17/66* (2013.01); *H01C 7/12* (2013.01); *H02H 9/044* (2013.01)

(58) Field of Classification Search
CPC .......... H01C 7/12; H01C 7/126; H01B 17/16; H01B 17/38; H01B 17/66; H02H 9/044
(Continued)

(56) References Cited

U.S. PATENT DOCUMENTS

| 4,930,039 A | 5/1990 | Woodworth et al. |
| 4,989,115 A | 1/1991 | Bourdages et al. |

(Continued)

FOREIGN PATENT DOCUMENTS

| CN | 201215749 Y | 4/2009 |
| CN | 201435277 Y | 3/2010 |

(Continued)

OTHER PUBLICATIONS

Extended European Search Report dated Apr. 28, 2020 for European Patent Application No. 16917131.1, 9 pages.
(Continued)

*Primary Examiner* — Kevin J Comber
(74) *Attorney, Agent, or Firm* — Sage Patent Group (57) ABSTRACT

A surge arrester and a method for manufacturing the surge arrester are disclosed. The surge arrester includes a preassembled active part extending in a longitudinal direction, and a separately produced flexible housing defining a bore in the longitudinal direction and having an opening at an end surface of the flexible housing. The flexible housing is arranged surrounding the active part via the bore and in contact with the active part. The contact causes a deformation of the flexible housing in a circumferential direction, and the deformation generates a pressure applied on the active part along a radial direction.

17 Claims, 4 Drawing Sheets

(51) Int. Cl.
*H01B 17/38* (2006.01)
*H01B 17/66* (2006.01)
*H02H 9/04* (2006.01)

(58) Field of Classification Search
USPC .......................................................... 361/117
See application file for complete search history.

(56) References Cited

U.S. PATENT DOCUMENTS

| | | | |
|---|---|---|---|
| 5,684,665 | A | 11/1997 | Rudy |
| 6,735,068 | B1 | 5/2004 | Hartman et al. |
| 8,593,775 | B2 | 11/2013 | Gebhardt et al. |
| 2003/0128492 | A1 | 7/2003 | Berlovan et al. |
| 2004/0111867 | A1 | 6/2004 | Hassanzadeh et al. |
| 2006/0279895 | A1 | 12/2006 | Yamaguchi et al. |
| 2016/0148728 | A1* | 5/2016 | Doser ............... H01C 1/02 338/21 |

FOREIGN PATENT DOCUMENTS

| | | |
|---|---|---|
| CN | 102301434 A | 12/2011 |
| CN | 202650747 U | 1/2013 |
| CN | 204391738 U | 6/2015 |
| CN | 204463966 U | 7/2015 |
| CN | 105632664 A | 6/2016 |
| RU | 2292096 C2 | 1/2007 |
| RU | 2561203 C2 | 8/2015 |
| SU | 1739391 A1 | 6/1992 |
| WO | 9326017 A1 | 12/1993 |

OTHER PUBLICATIONS

Chinese Patent Office, First Office Action issued in corresponding Chinese application No. 2016800862782, dated Nov. 28, 2019, 26 pp.
Chinese Patent Office, Search Report issued in corresponding Chinese application No. 2016800862782, dated Nov. 20, 2019, 5 pp.
Australian Examination Report, Australian patent application No. 2016424708, dated May 2, 2019, 3 pages.
Russian Office Action, Russian Patent Applicatino No. 2018141755/07, dated Jul. 11, 2019, 12 pages including English translations.
Intellectual Property Office of the P.R. China, International Search Report & Written Opinion issued in corresponding Application No. PCT/CN2016/100609, dated Jul. 10, 2017, 8 pp.

* cited by examiner

SURGE ARRESTER AND ASSOCIATED MANUFACTURING METHOD

FIELD

Embodiments of present disclosure generally relates to an electrical apparatus, and more particularly, to a surge arrester and a method for manufacturing the same.

BACKGROUND

Surge arrestor today is playing a very important role in protecting critical and expensive equipment, such as transformers, switching devices, and computing devices, from over-voltage conditions. Conventional surge arrester typically includes an outer insulating enclosure, a pair of electrodes at opposite of the enclosure for connecting the surge arrester between a line-potential conductor and ground, and multiple varistors stacked between the pair of electrodes for dissipating the surge in the current generated by the over-voltage condition.

Such surge arrestors, however, usually suffers from several disadvantageous such as complicated fabrication and assembly process, high fabrication and material cost, and long production time. Therefore, it is desired to in various application fields to have cost-effective, easy-to-fabricate/assemble, and high-performance surge arrester.

U.S. Pat. No. 8,593,775 discloses a modular assembled surge arrester. However, its assembly still relies on a pluggable connecting element arranged between the active part and the housing, and the connecting element is produced in an injection molding method or die-casting method. U.S. Pat. No. 5,684,665 discloses a modular assembled surge arrester. However, it requires a "shoulder" structure to connect the conductive electrical component, and the assembly procedure is still complicated. U.S. Pat. No. 6,735,068 discloses an electrical apparatus employing one or more housing segments. However, its assembly still relies on bots or pins.

SUMMARY

In first aspect of present disclosure, a surge arrester is provided. The surge arrester comprises a preassembled active part extending in a longitudinal direction, and a separately produced flexible housing defining a bore in the longitudinal direction and having an opening at an end surface of the flexible housing. The flexible housing is arranged surrounding the active part via the bore and in contact with the active part. The contact causes a deformation of the flexible housing in a circumferential direction, and the deformation generates a pressure applied on the active part along a radial direction.

In some embodiments, the surge arrester further comprises an interface layer. The interface layer is made of a dielectric material and arranged between the active part and the flexible housing for filling small gaps and irregularities in the active part or the flexible housing.

In some embodiments, the surge arrester further comprises a fixation which is arranged between the active part and the flexible housing for joining the active part with the flexible housing.

In some embodiments, the fixation is in a form of an adhesive layer covering at least major portion of lateral surface of active part or covering complete inner surface of the flexible housing.

In some embodiments, the fixation is in a form of friction welding or mechanical attachment for fixing the active part to the flexible housing along the longitudinal direction.

In some embodiments, the active part comprises electrodes arranged at ends of the active part, and metal-oxide-resistor (MOR) blocks stacked between the electrodes in the longitudinal direction.

In some embodiments, the active part further comprises an alignment layer comprising stripes of thin tape arranged for aligning the MOR blocks and the electrodes.

In some embodiments, the alignment layer comprises a circumferential alignment layer. The circumferential alignment layer comprises stripes of thin tape arranged for circumferentially wrapping and sealing the interfaces between the MOR blocks and the electrodes, and the interfaces between MOR blocks to align the MOR blocks and the electrodes.

In some embodiments, the alignment layer comprises an axial alignment layer. The axial alignment layer comprises stripes of thin tape arranged axially to align the MOR blocks and the electrodes.

In some embodiments, the active part comprises an electrically conducting flat spring element arranged between MOR blocks or between the MOR blocks and the electrodes.

In some embodiments, the flexible housing comprises a thermoplastic or thermoset supporting member including a plurality of supporting pieces extending in the longitudinal direction. The supporting pieces are arranged along the circumferential direction in contact with a lateral surface of the active part. The flexible housing further comprises an external insulation which is made of a flexible material and injected, casted or extruded at the supporting member.

In some embodiments, the external insulation is made of flexible material and injected, casted or extruded around the thermoplastic or thermoset supporting member, and wherein the supporting piece includes an extrusion at an end, and the active part includes a corresponding recess matching a shape of the extrusion at an end.

In some embodiments, the flexible housing further comprises a primer layer arranged on an outer surface of the thermoplastic or thermoset supporting member for bonding the external insulation with the supporting member.

In some embodiments, the external insulation is a one-piece external insulation made of room temperature expandable material which is selected from a group consisting of silicon rubber (SiR), thermoplastic elastomer (TPE), ethylene-popylene-diene monomer rubber, ethylene-vinyl acetate rubber, fluoro-silicones, fluoro-elastomers, flexibilized epoxy resin or any combinations thereof.

In some embodiments, the external insulation is a one-piece external insulation made of high temperature heat-shrinkable material which is made of heat shrink materials selected from a group consisting of polyethylene, polyvinyl chloride, ethylene-vinyl acetate, acrylonitrile butadiene styrene, and polyurethane.

In some embodiments, the external insulation includes sheds for outdoor application.

In some embodiments, in response to a contact of the plurality supporting pieces with the active part, the plurality of supporting pieces are separated from one another to form a gap in the circumferential direction, the gap allowing an internal are to escape to the outside of the surge arrester in a case of an electrical overloading.

In some embodiments, the surge arrester further comprises a protection cap arranged at the opening at the end surface of the flexible housing for enclosing the active part.

In second aspect of present disclosure, a method for manufacturing surge arrester is provided. The method comprises inserting an active part of the surge arrester into a bore of a flexible housing along the longitudinal direction so that the flexible housing surrounds the active part, wherein the bore has an opening at an end surface of the flexible housing. The method further comprises causing a contact between the flexible housing and the active part, wherein the contact leads to a deformation of the flexible housing in a circumferential direction which generates a pressure applied on the active part along the radial direction.

In some embodiments, the method further comprises arranging an interface layer made of a dielectric material between the active part and the flexible housing for filling small gaps and irregularities in the active part or the flexible housing.

In some embodiments, the method further comprises joining the active part with the flexible housing by a fixation.

In some embodiments, the fixation in a form of an adhesive layer covering at least major portion of lateral surface of active part or covering complete inner surface of the flexible housing.

In some embodiments, the fixation is in a form of friction welding or mechanical attachment for fixing the active part to the flexible housing along the longitudinal direction.

In some embodiments, the method further comprises forming the active part by stacking metal-oxide-resistor (MOR) blocks in the longitudinal direction, and arranging electrodes at ends of the stacked MOR blocks.

In some embodiments, the method further comprises arranging an alignment layer comprising stripes of thin tape for aligning the MOR blocks and the electrodes In some embodiments, the arranging the alignment layer comprises circumferentially wrapping and sealing the interfaces between the MOR blocks and the electrodes, and the interfaces between MOR blocks to align the MOR blocks and the electrodes via a circumferential alignment layer comprising stripes of thin tape.

In some embodiments, the arranging the alignment layer comprises axially aligning the MOR blocks and the electrodes via an axial alignment layer comprising stripes of thin tape.

In some embodiments, the stacking metal-oxide-resistor (MOR) blocks comprises arranging an electrically conducting flat spring element between the MOR blocks or between the MOR blocks and the electrodes, during stacking MOR blocks.

In some embodiments, the method further comprises obtaining the flexible housing by arranging a thermoplastic or thermoset supporting member including a plurality of supporting pieces extending in the longitudinal direction, wherein the supporting pieces is arranged along the circumferential direction to be in contact with a lateral surface of the active part. The method further comprises forming an external insulation by injecting, casting or extruding a flexible material at the thermoplastic or thermoset supporting member.

In some embodiments, forming the external insulation comprises forming an external insulation by injecting, casting or extruding a flexible material around the thermoplastic or thermoset supporting member, wherein the supporting piece includes an extrusion at an end, and the active part includes a corresponding recess matching a shape of the extrusion at an end.

In some embodiments, the method further comprises arranging a primer layer on an outer surface of the thermoplastic or thermoset supporting member for bonding the external insulation with the thermoplastic or thermoset supporting member.

In some embodiments, causing the contact comprises heating the flexible housing to enable a shrink of the external insulation in the radial direction, wherein the external insulation is a one-piece external insulation made of high temperature heat-shrinkable material which is selected from a group consisting of polyethylene, polyvinyl chloride, ethylene-vinyl acetate, acrylonitrile butadiene styrene, and polyurethane.

In some embodiments, the method further comprises prior to inserting the active part, expanding the external insulation of the surge arrester along a radial direction, wherein the external insulation is a one-piece external insulation made of room temperature expandable material which is selected from a group consisting of silicon rubber (SiR), thermoplastic elastomer (TPE), ethylene-popylene-diene monomer rubber, ethylene-vinyl acetate rubber, fluoro-silicones, fluoroelastomers, flexibilized epoxy resin or any combinations thereof.

In some embodiments, the causing of the contact comprises releasing the external insulation to cause the contact between the external insulation and the active part.

In some embodiments, the forming the external insulation comprises forming sheds for outdoor application.

In some embodiments, the plurality supporting pieces are arranged in such a way that in response to a contact of the plurality of supporting pieces with the active part, the plurality of supporting pieces are separated from one another to form a gap in the circumferential direction, wherein the gap allows an internal arc to escape to the outside of the surge arrester in a case of an electrical overloading.

In some embodiments, the method further comprises arranging a protection cap at the opening at the end surface of the flexible housing for enclosing the active part.

In third aspect of present disclosure, equipment arranged to carry out the method according to the second aspect of present disclosure is provided.

In fourth aspect of present disclosure, use of the surge arrester according to the first aspect of present disclosure as a protection element in an electrical power network is provided.

It would be apparent through the following discussions that compared to conventional surge arresters, such modular component-based surge arrester according to various embodiments of present disclosure requires fewer components, adopts less-expensive components, and thereby reduces the total material cost. Meanwhile, due to the modular design, the assembly process is simplified and the manufacture/assembly time is reduced.

DESCRIPTION OF DRAWINGS

Drawings described herein are provided to further explain the present disclosure and constitute a part of the present application. The example embodiments of the disclosure and the explanation thereof are used to explain the present disclosure, rather than to limit the present disclosure improperly.

Throughout the drawings, the same or similar reference symbols are used to indicate the same or similar elements.

DETAILED DESCRIPTION OF EMBODIMENTS

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

Figure 1A:
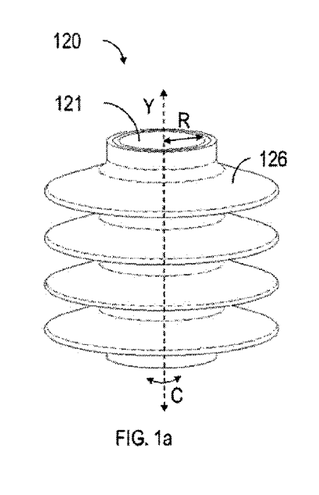
FIG. 1a is perspective view of a flexible housing of a surge arrester according to embodiments of the present disclosure.
Figure 1B:
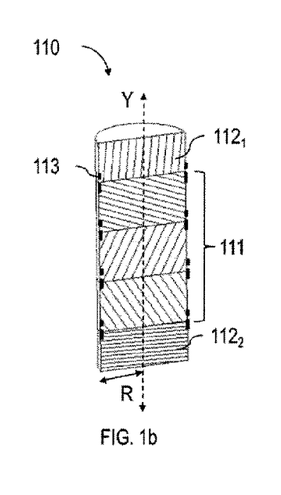
FIG. 1b is a cross-sectional view of an active part of a surge arrester according to embodiments of the present disclosure.
Figure 1C:
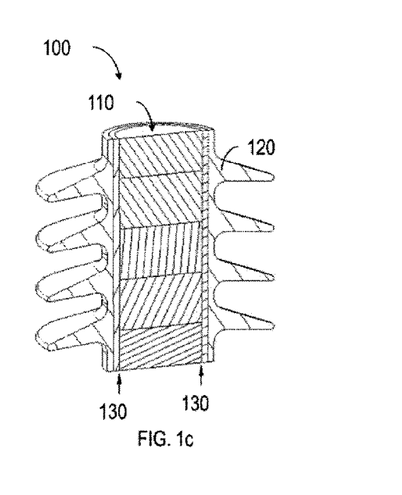
FIG. 1c is a cross-sectional view of a surge arrester in an assembled state according to embodiments of the present disclosure.

FIGS. 1a-1c show a surge arrester 100 according to an embodiment of the present disclosure. The surge arrester 100 generally includes an active part 110 and a separately produced flexible housing 120. As shown in FIG. 1a, the active part 110 includes a substantially cylindrical lateral surface and extends in a longitudinal direction Y. The separately produced flexible housing 120 defines an inner bore 121 in the longitudinal direction Y. The inner bore 121 extends through the entire length of the flexible housing 120 and forms an opening at each of two opposite end surfaces 126 of the flexible housing 120.

In some embodiments, the inner bore 121 may have a cylindrical wall to conform to the curvature of the cylindrical lateral surface of the active part 110. Compared to the conventional surge arresters, such modular components-based surge arrester 100 of present disclosure relies on a reduced amount of components, avoids expensive components, and therefore significantly reduces the material, fabrication and assembly cost and thereby the production time. In addition, such a modular components-based surge arrester 100 allows manufacturers to individually fabricate all necessary components and store them for a future assembly, which will potentially shorten the assembly time.

FIG. 1c shows a cross-sectional view of a surge arrester in an assembled state. As shown in FIG. 1c, the flexible housing 120 is arranged surrounding the active part 110 via the bore 121 and in contact with the active part 110. The contact causes a deformation of the flexible housing 120 in a circumferential direction C. Such deformation then generates a pressure applied on the active part 110 along a radial direction R, so that the flexible housing 120 can be circumferentially and elastically fixed around the active part 110. Such arrangement would be beneficial because the fixation of the flexible housing 120 to the active part 110 mainly relies on the force generated by the deformation of the flexible housing. As such, no additional fixing structure or mechanism is required.

In some embodiments, the surge arrester 100 may further include an interface layer (not shown) made of a dielectric material. The interface layer is arranged between the active part 110 and the flexible housing 120 for filling small gaps and irregularities in the active part 110 or the flexible housing 120.

In some embodiments, the surge arrester 100 may further include a fixation 130 arranged between the active part 110 and the flexible housing 120 for joining the active part 110 with the flexible housing 120. The fixation 130 may take the form of an adhesive layer covering at least a major portion of lateral surface of active part 110 or covering complete inner surface of the flexible housing 120. For example, the adhesive layer 130 as shown in FIG. 1c is arranged between the active part 110 and the flexible housing 120 for bonding the active part 110 with the flexible housing 120. Such adhesive layer 130 may be formed by an adhesive dispensed on an outer surface of the active part 110.

The fixation 130 may also take the form of friction welding or mechanical attachment for fixing the active part 110 to the flexible housing 120 along the longitudinal direction Y. Examples of the mechanical attachment include, but are not limited to, friction riveting, bolts, crimping, screw or their combinations. However, it is to be understood that the form of fixation 130 is not limited to the shown examples. Other types of fixation along with their combinations are also conceivable.

FIG. 1b shows a cross-sectional view of an active part 110 of the surge arrester 100. The active part 110 includes two electrodes $112_1$, $112_2$, and metal-oxide-resistor MOR blocks 111. The electrodes $112_1$, $112_2$ are arranged at two opposite ends of the active part 110 to conduct the current through the active part 110. For the purpose of clarity, three MOR blocks 111 are shown. However, it is to be understood that the number of MOR blocks 111 is not limited to the shown example. In other embodiments, a single large MOR block or more than three MOR blocks 111 is also possible.

As shown in FIG. 1b, the three MOR blocks 111 are stacked one on top of the other between the two electrodes $112_1$, $112_2$ in the longitudinal direction Y forming a substantially cylindrical body. Optionally, the active part 110 may also include an electrically conducting flat spring element (not shown) that is arranged between MOR blocks ill, or between MOR blocks 111 and electrodes $112_1$, $112_2$ acting as an electrical and mechanical contact element in the stack. For example, the flat spring element may be a Bellville washer spring, plate spring and so on.

The surge arrester 100 may further include an alignment layer 113, which includes stripes of thin tape arranged for aligning the MOR blocks 111 and the electrodes $112_1$, $112_2$. Depending on its orientation, the alignment layer 113 may be a circumferential alignment layer 113. As shown in FIG. 1b, the circumferential alignment layer 113 includes stripes of thin tape (represented by several short thick vertical dotted lines) arranged for circumferentially wrapping and sealing the interfaces between the MOR blocks 111 and the electrodes $112_1$, $112_2$, and the interfaces between the MOR blocks only. Such circumferential alignment layer 113 helps to align the MOR blocks 111 and the electrodes $112_1$, $112_2$, and effectively prevents a possible infiltration of the adhesive layer 130. In some other embodiments, the alignment layer 113 may be an axial alignment layer 113, which also includes stripes of thin tape, but those stripes of thin tape is arranged axially to align the MOR blocks 111 and the electrodes $112_1$, $112_2$.

With the above alignment layer 113, relative lateral movement of one MOR block to the other can be prevented, so that all MOR blocks are kept substantially aligned with each other in the longitudinal direction Y. Besides, such alignment layer 113 may also provide a sufficient longitudinal contact force between adjacent MOR blocks under certain circumferences/applications. Therefore, no additional structure or mechanism for applying load in the longitudinal direction Y is required, which eases the fabrication process.

Figure 2A:
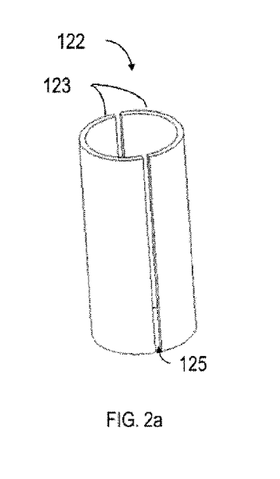
FIG. 2a is perspective view of a supporting member including two supporting pieces of a surge arrester according to embodiments of the present disclosure.
Figure 2B:
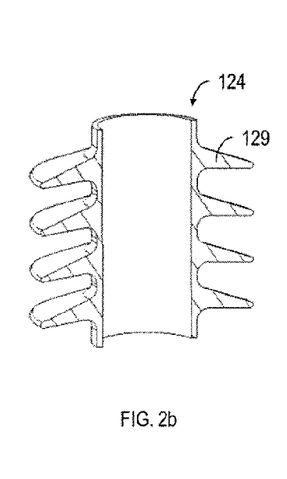
FIG. 2b is a cross-sectional view of an external insulation of a flexible housing of a surge arrester according to embodiments of the present disclosure.
Figure 2C:
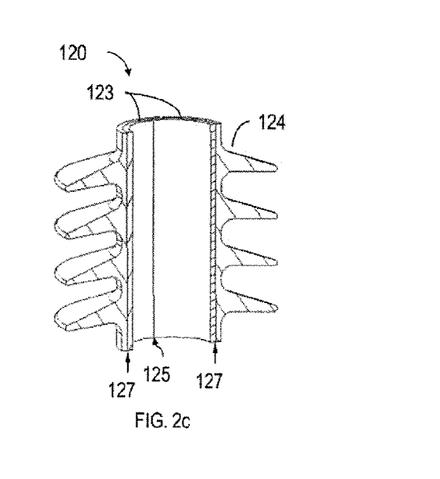
FIG. 2c is a cross-sectional view of a flexible housing of a surge arrester according to embodiments of the present disclosure.

Now referring to FIGS. 2a-2c, the flexible housing 120 includes a thermoplastic or thermoset supporting member 122 and an external insulation 124. The supporting member 122, as an example, includes two supporting pieces 123 both extending in the longitudinal direction Y. The two supporting pieces 123 are arranged along the circumferential direction C to be in contact with a lateral surface of the active part 110.

As shown in FIG. 2a, the two supporting pieces 123 may be evenly or symmetrically spaced around the cylindrical body of the active part 110 forming a substantially complete circle. Such supporting member 122 in a form of a tube improves the overall enforcement and mechanical rigidity of the flexible housing 120. Although FIG. 2a shows a supporting member 122 including two supporting pieces 123, a supporting member 122 including more than two, such as three, four or five supporting pieces 123 is also possible.

Figure 3A:
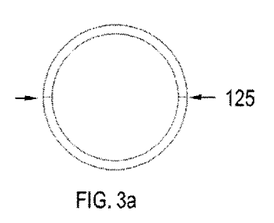
FIG. 3a is a top view of a supporting member including two supporting pieces of a surge arrester with no initial gaps according to embodiments of the present disclosure.
Figure 3B:
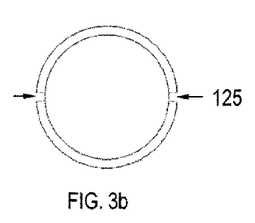
FIG. 3b is a top view of a supporting member including two supporting pieces with initial gaps according to embodiments of the present disclosure.
Figure 3C:
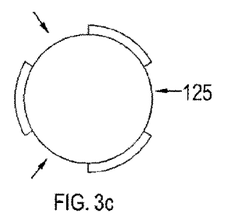
FIG. 3c is a top view of a supporting member including three supporting pieces with initial gaps according to embodiments of the present disclosure.

As an example, FIGS. 3b and 3c show supporting members 122 including two and three supporting pieces 123, respectively. As another example, FIGS. 3d and 3e both show a supporting member 122 including six supporting pieces 123. The six supporting pieces 123 depicted in FIG. 3d likewise evenly circumferentially around the cylindrical body of the active part 110 forming a complete circle. Each supporting piece has a curvature in order to substantially conform to the curvature of the cylindrical body.

In some embodiments, one or more of the supporting pieces 123 may each include a pressure release window 128 for releasing the overpressure generated inside the inner space defined by the supporting member 122. The overpressure may be generated due to a high short-circuit current especially for a high voltage system. As depicted in FIG. 3f, each of the six supporting piece 123 includes at least one pressure release window 128 on its lateral surface.

It is to be noted that the configurations of such pressure release windows 128 can vary according to the specific requirement. For example, the pressure release window 128 can be configured to be a through-hole with various shape and size, or it can be configured to be a defined region (e.g. by cutting tools) with a smaller thickness than that of the surrounding region of the supporting piece 123. By properly designing the configuration of the pressure release window 128, the overpressure can be quickly released out of the surge arrestor with no difficulty.

Figure 3D:
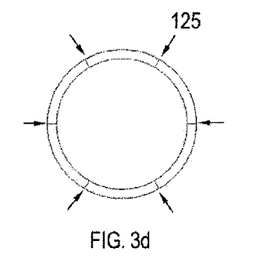
FIG. 3d is a top view of a supporting member including six supporting pieces with no initial gaps according to embodiments of the present disclosure.
Figure 3E:
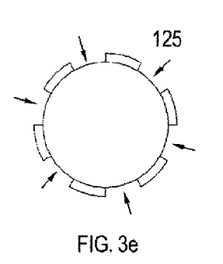
FIG. 3e is a top view of a supporting member including six supporting pieces with initial gaps according to embodiments of the present disclosure.
Figure 3F:
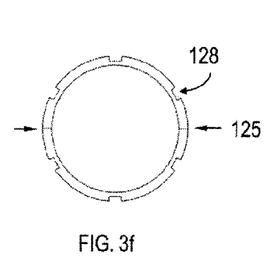
FIG. 3f is a top view of a supporting member including six supporting pieces with a pressure release window on each of them, and with no initial gap according to embodiments of the present disclosure.

In some embodiments depicted in FIG. 3a, 3d or 3f, in an unassembled state, all supporting pieces 123 connect one with the other in an "end-to-end" fashion, with no initial gap existing between any two adjacent supporting pieces 123. In other words, all gaps 125 are initially closed in the unassembled state. Upon the insertion of the active part 110 into the bore 121 (or in an assembled state), the plurality of supporting pieces 123 are separated from one another to form a small gap 125 in the circumferential direction C. As shown in FIG. 3a, 3d or 3f, the position of each small gap 125 that will appear under the assembled state is indicated with a respective arrow. It is also possible to predefine gaps between neighboring supporting pieces 123 as shown in FIG. 3b, 3c or 3e, and in some embodiments, those predefined gaps 125 may be filled with SiR or adhesive.

Figure 4A:
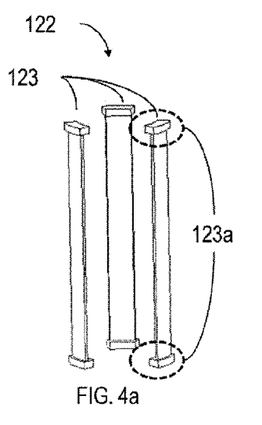
FIG. 4a is a perspective view of a supporting member including three supporting pieces with an extrusion at each end according to embodiments of the present disclosure.
Figure 4B:
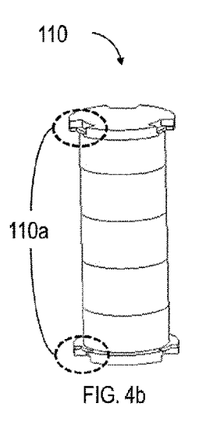
FIG. 4b is a perspective view of an active part with a corresponding recess matching the extrusion of FIG. 4a according to embodiments of the present disclosure.
Figure 4C:
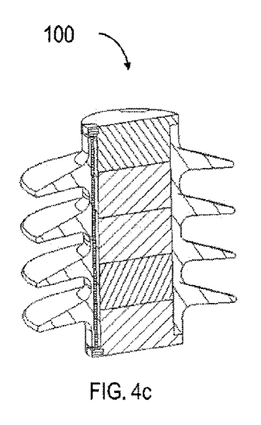
FIG. 4c is a cross-sectional view of a surge arrester in an assembled state according to embodiments of the present disclosure.

In some embodiments depicted in FIG. 2c, the external insulation 124 is made of a flexible material and injected, casted or extruded on the supporting member 122. In some embodiments depicted in FIG. 4c, an external insulation 124 is made of flexible material and injected, casted or extruded around the thermoplastic or thermoset supporting member 122, and in other words, the supporting member 122 is embedded in the wall of the external insulation 124. Further, the supporting piece 123 as shown in FIG. 4c includes an extrusion 123a at each end of the supporting piece 123 forming a bone-like structure, and the active part 110 as shown in FIG. 4b includes a corresponding recess 110a at each end to match the shape of the extrusion 123a, or to receive the extrusion 123a. In this way, a rotation of the external insulation 124 about the active part 110 can be effectively avoided.

Now returning to FIG. 2c, in the shown embodiment, a primer layer 127 is arranged on an outer surface of the thermoplastic supporting member 122 in order to bond the external insulation 124 to be injected on the primer layer 127. In other words, the primer layer 127 acting as a bonding layer is uniformly distributed and sandwiched between the outer surface of supporting member 122 and the inner wall of the external insulation 124. In some embodiments, the material of the primer layer 127 is selected from a group consisting of silicone resin SiR, polyurethane, ethylene-vinyl acetate and any combinations thereof.

In some embodiments, the supporting member 122 is made of a thermoplastic material that is selected from a group consisting of Acrylonitrile-butadiene-styrene, polyamide, Polyphthalamide, polybutylene terephthalate, polyethylene terephthalate, polytrimethylene terephthalate, Polyvinylchloride, Polycarbonate and any combinations thereof. Such thermoplastic material is recyclable and easy to process. The supporting member 122 can also be made of a thermoset material such as epoxy resin. The above thermoplastic or thermoset material would be beneficial because it enables sufficient insulation and meanwhile reduces the overall material cost of the housing 120.

Depending on different fabrication procedures of the surge arrester 100, the external insulation 124 may be made of different types of materials accordingly. For example, the external insulation 124 can be made of room temperature expandable material which is selected from a group consisting of silicon rubber (SiR), thermoplastic elastomer (TPE), ethylene-popylene-diene monomer rubber, ethylene-vinyl acetate rubber, fluoro-silicones, fluoro-elastomers, flexibilized epoxy resin or any combinations thereof. Further, the external insulation 124 may be made of high temperature heat-shrinkable material which is selected from a group consisting of polyethylene, polyvinyl chloride, ethylene-vinyl acetate, acrylonitrile butadiene styrene, and polyurethane.

In some embodiments, the external insulation 124 may also include sheds 129 for outdoor application. As shown in FIG. 2b, the outer surface of external insulation 124 may include several sheds in the form of fins or protrusions 129 pointing outwards in the radial direction R.

As shown in FIG. 2b or FIG. 4c, the external insulation 124 is a one-piece component. Such one-piece external insulation 124 made of flexible material and fabricated by e.g. injection technique enables a flexible design of the external insulation and a low fabrication cost. For example, the fins or protrusions 129 can be formed as part of the external insulation during a same injection process. In addition, such one-piece external insulation 124, together with the likewise one-piece active part 110 as discussed above makes the fabrication and assembly process of the surge arrester 100 easy and cost-effective.

In some embodiments, the surge arrester 100 may further include a protection cap (not shown) arranged to cover each opening at the end surface 126 of the flexible housing 120. Such protection cap encloses the active part 110 to protect it from moisture, wind or other hazardous conditions.

Figure 5:
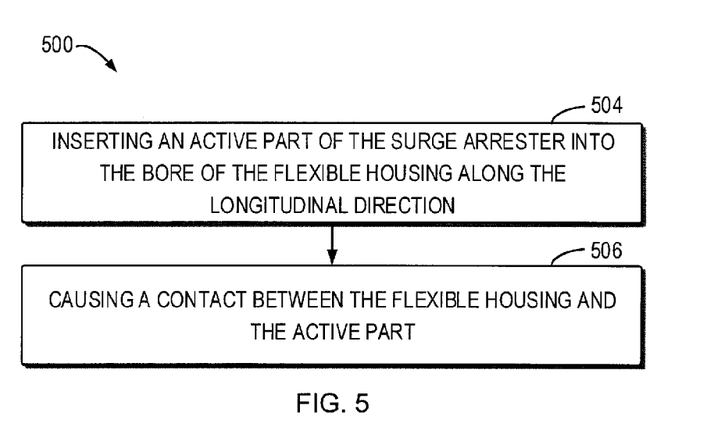
FIG. 5 is a flow chart of manufacturing a surge arrester according to embodiments of the present disclosure.

FIG. 5 shows a flowchart of a method 500 for manufacturing a surge arrester 100. In accordance with embodiments of the present disclosure, the modular surge arrester 100 as described above is manufactured in a simplified way that includes fewer steps compared to the conventional manufacturing process. In general, the method 500 includes following steps.

At 504, an active part 110 of the surge arrester 100 is inserted into a bore 121 of a flexible housing 120 along the longitudinal direction Y, so that the flexible housing 120 surrounds the active part 110. At 506, a contact between the flexible housing 120 and the active part 110 is caused. The contact leads to a deformation of the flexible housing 120 in a circumferential direction C which generates a pressure applied on the active part 110 along the radial direction R.

In some embodiments, an interface layer made of a dielectric material may be arranged between the active part 110 and the flexible housing 120 for filling small gaps and irregularities in the active part 110 or the flexible housing 120. In some embodiments, the active part 110 may be bonded with the flexible housing 120 by a fixation 130. As discussed above, the fixation 130 may take the form of an adhesive layer covering at least major portion of lateral surface of active part 110 or covering complete inner surface of the flexible housing 120. The fixation 130 may also take the form of friction welding or mechanical attachment for fixing the active part 110 to the flexible housing 120. In a practical embodiment, the electrodes $112_1$, $112_2$ may be fixed to the thermoplastic or thermoset supporting member 122 via a mechanical attachment along the longitudinal direction Y.

In some embodiments, the active part 110 can be pre-formed in a separate fabrication process. In the separate fabrication process of the active part 110, MOR blocks 111 are stacked in the longitudinal direction Y, and electrodes $112_1$, $112_2$ are arranged at ends of the stacked MOR blocks 111.

In some embodiments, an alignment layer 113 comprising stripes of thin tape for aligning the MOR blocks 111 and the electrodes $112_1$, $112_2$ is arranged. Arranging the alignment layer 113 may include circumferentially wrapping and sealing the interfaces between the MOR blocks 111 and the electrodes $112_1$, $112_2$, and the interfaces between the MOR blocks only. Arranging the alignment layer 113 may also include axially aligning the MOR blocks 111 and the electrodes $112_1$, $112_2$.

In some embodiments, the flexible housing 120 likewise can be pre-formed in a separate fabrication process. In the separate fabrication process of the flexible housing 120, a thermoplastic supporting member 122 including a plurality of supporting pieces 123 is first arranged extending in the longitudinal direction Y. Those supporting pieces 123 then are arranged along the circumferential direction C to be in contact with a lateral surface of the active part 110.

In some embodiments, the plurality supporting pieces 123 may be arranged in such a way that in responsive to a contact of the plurality supporting pieces 123 with the active part 110, the plurality of supporting pieces 123 are separated from one another to form a small gap 125 in the circumferential direction C.

After the supporting member 122 is done, a primer layer 127 may be arranged on an outer surface of the thermoplastic supporting member 122 in order to provide a bonding layer. An external insulation 124 then is formed by injecting a flexible material on the primer layer 127. As discussed above, the external insulation 124 may be a one-piece external insulation, and the injected flexible material is selected from a group consisting of silicon rubber, TPE and SiR/TPE.

Figure 6:
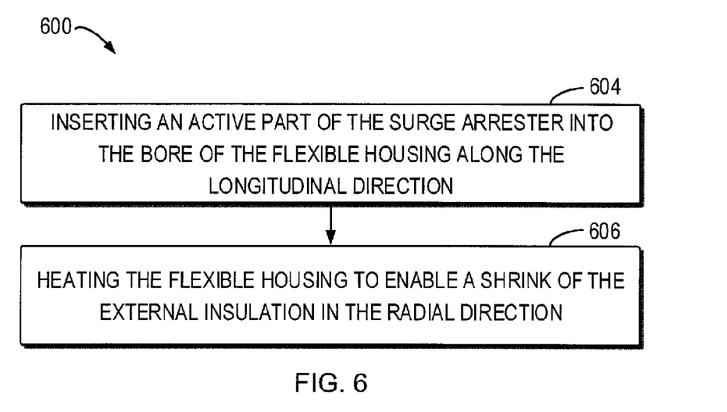
FIG. 6 is a flow chart of manufacturing a surge arrester according to embodiments of the present disclosure.

Depending on different fabrication procedures of the surge arrester 100, the material of external insulation 124 may be selected from different types of materials accordingly. FIG. 6 shows a flowchart of a method 600 for manufacturing a surge arrester 100 according to some embodiments of present disclosure. The method 600 is particularly suitable for fabricating a surge arrester 100 with its external insulation 124 made of high temperature heat-shrinkable material. Such high temperature heat-shrinkable material is selected from a group consisting of polyethylene, polyvinyl chloride, ethylene-vinyl acetate, acrylonitrile butadiene styrene, and polyurethane.

Similar to the method 500, in the method 600, at 604, an active part 110 of the surge arrester 100 is inserted into a bore 121 of a flexible housing 120 along the longitudinal direction Y, so that the flexible housing 120 surrounds the active part 110. Next, at 606, for the external insulation 124 made of such type of material, heating the flexible housing 120 (or external insulation 124) will enable a shrink of the external insulation 124 in the radial direction R, and thereby causing a contact between the flexible housing 120 and the active part 110.

Figure 7:
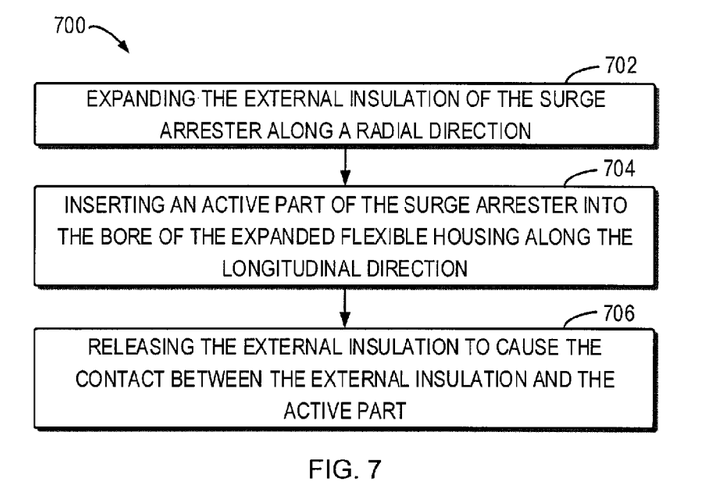
FIG. 7 is a flow chart of manufacturing a surge arrester according to embodiments of the present disclosure.

FIG. 7 shows a flowchart of a method 700 for manufacturing a surge arrester 100 according to some embodiments of present disclosure. The method 700 is particularly suitable for fabricating a surge arrester 100 with its external insulation 124 made of room temperature expandable material. Such room temperature expandable material is selected from a group consisting of silicon rubber (SiR), thermoplastic elastomer (TPE), ethylene-popylene-diene monomer rubber, ethylene-vinyl acetate rubber, fluoro-silicones, fluoro-elastomers, flexibilized epoxy resin or any combinations thereof.

Similar to the method 600, in the method 700, at 704, an active part 110 of the surge arrester 100 is inserted into a bore 121 of a flexible housing 120 along the longitudinal direction Y, so that the flexible housing 120 surrounds the active part 110. Unlike the method 600, prior to inserting the active part 110 (that is, 704), at 702, the external insulation 124 made of such room temperature expandable material needs to be first expanded along a radial direction R. Then, after the active part 110 is inserted into the bore 121 of the expanded flexible housing 120, at 706, the external insulation 124 is released to cause the contact between the external insulation 124 and the active part 110.

Optionally, a protection cap can be arranged at the opening at the end surface 126 of the flexible housing 120 for enclosing the active part 110, in order to protect the active part 110 from moisture, wind or other hazardous conditions.

It should be appreciated that the above detailed embodiments of the present disclosure are only to exemplify or explain principles of the present disclosure and not to limit the present disclosure. Therefore, any modifications, equivalent alternatives and improvement, etc. without departing from the spirit and scope of the present disclosure shall be included in the scope of protection of the present disclosure. Meanwhile, appended claims of the present disclosure aim to cover all the variations and modifications falling under the scope and boundary of the claims or equivalents of the scope and boundary.

What is claimed is:

1. A surge arrester, comprising:
   a preassembled active part extending in a longitudinal direction; and
   a separately produced flexible housing defining a bore in the longitudinal direction and having an opening at an end surface of the flexible housing,
   the flexible housing being arranged surrounding the active part via the bore and in contact with the active part, the contact causing a deformation of the flexible housing in a circumferential direction, the deformation generating a pressure applied on the active part along a radial direction,
   wherein the flexible housing comprises a thermoplastic or thermoset supporting member including a plurality of supporting pieces extending in the longitudinal direction, the supporting pieces being arranged along the circumferential direction in contact with a lateral surface of the active part,
   wherein the flexible housing comprises an external insulation made of a flexible material and injected, casted or extruded at the supporting member.

2. The surge arrester according to claim 1, further comprising:
   an interface layer made of a dielectric material arranged between the active part and the flexible housing for filling small gaps and irregularities in the active part or the flexible housing.

3. The surge arrester according to claim 1, further comprising:
   a fixation arranged between the active part and the flexible housing for joining the active part with the flexible housing.

4. The surge arrester according to claim 3, where in the fixation is in a form of an adhesive layer covering at least major portion of lateral surface of active part or covering complete inner surface of the flexible housing.

5. The surge arrester according to claim 3, wherein the fixation is in a form of friction welding or mechanical attachment for fixing the active part to the flexible housing along the longitudinal direction.

6. The surge arrester according to claim 1, wherein the active part comprises:
   electrodes arranged at ends of the active part; and
   metal-oxide-resistor (MOR) blocks stacked between the electrodes in the longitudinal direction.

7. The surge arrester according to claim 6, further comprising:
   an alignment layer comprising stripes of thin tape arranged for aligning the MOR blocks and the electrodes.

8. The surge arrester according to claim 7, wherein the alignment layer comprises:
   a circumferential alignment layer comprising stripes of thin tape arranged for circumferentially wrapping and sealing the interfaces between the MOR blocks and the electrodes, and interfaces between the MOR blocks to align the MOR blocks and the electrodes.

9. The surge arrester according to claim 7, wherein the alignment layer comprises:
   an axial alignment layer comprising stripes of thin tape arranged axially to align the MOR blocks and the electrodes.

10. The surge arrester according to claim 6, wherein the active part comprises an electrically conducting flat spring element arranged between MOR blocks, or between the MOR blocks and the electrodes.

11. The surge arrester according to claim 1, wherein
    an external insulation made of flexible material and injected, casted or extruded around the thermoplastic or thermoset supporting member, and wherein the supporting piece includes an extrusion at an end, and the active part includes a corresponding recess matching a shape of the extrusion at an end.

12. The surge arrester according to claim 1, wherein the flexible housing further comprises:
    a primer layer arranged on an outer surface of the thermoplastic or thermoset supporting member for bonding the external insulation with the supporting member.

13. The surge arrester according to claim 1, wherein the external insulation is a one-piece external insulation made of room temperature expandable material which is selected from a group consisting of silicone rubber (SiR), thermoplastic elastomer (TPE), ethylene-propylene-diene monomer rubber, ethylene-vinyl acetate rubber, fluoro-silicones, fluoro-elastomers, flexibilized epoxy resin or any combinations thereof.

14. The surge arrester according to claim 1, wherein the external insulation is a one-piece external insulation made of high temperature heat-shrinkable material which is made of heat shrink materials selected from a group consisting of polyethylene, polyvinyl chloride, ethylene-vinyl acetate, acrylonitrile butadiene styrene, and polyurethane.

15. The surge arrester according to claim 1, wherein the external insulation includes sheds for outdoor application.

16. The surge arrester according to claim 1, further comprising:
    a protection cap arranged at the opening at the end surface of the flexible housing for enclosing the active part.

17. Use of the surge arrester according to claim 1 as a protection element in an electrical power network.

* * * * *